United States Patent
Wu et al.

(10) Patent No.: US 12,219,612 B2
(45) Date of Patent: *Feb. 4, 2025

(54) RANDOM ACCESS METHOD, TERMINAL, AND NETWORK DEVICE

(71) Applicant: VIVO MOBILE COMMUNICATION CO., LTD., Dongguan (CN)

(72) Inventors: Yumin Wu, Dongguan (CN); Wei Bao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,871

(22) Filed: May 26, 2023

(65) Prior Publication Data

US 2023/0300897 A1    Sep. 21, 2023

Related U.S. Application Data

(63) Continuation of application No. 16/953,164, filed on Nov. 19, 2020, now Pat. No. 11,706,808, which is a
(Continued)

(30) Foreign Application Priority Data

Jun. 21, 2018 (CN) .......................... 201810645997.4

(51) Int. Cl.
*H04W 74/08* (2024.01)
*H04W 72/0453* (2023.01)
*H04W 74/0833* (2024.01)

(52) U.S. Cl.
CPC ... *H04W 74/0833* (2013.01); *H04W 72/0453* (2013.01)

(58) Field of Classification Search
CPC ......... H04W 74/0833; H04W 72/0453; H04W 74/006; H04W 76/25; H04W 24/02; H04W 72/04; H04W 76/32; H04W 76/03
See application file for complete search history.

(56) References Cited

U.S. PATENT DOCUMENTS 9,949,195 B1 * 4/2018 Oroskar ............ H04W 36/0077
2018/0368186 A1 * 12/2018 Gu ..................... H04W 56/001

FOREIGN PATENT DOCUMENTS

| CN | 101478824 A | 7/2009 |
| CN | 104619036 A | 5/2015 |

(Continued)

OTHER PUBLICATIONS

International Search Report issued in corresponding International Application No. PCT/CN2019/088880, mailed Aug. 28, 2019, 4 pages.
(Continued)

*Primary Examiner* — Lewis G West
(74) *Attorney, Agent, or Firm* — IPX PLLC

(57) ABSTRACT

A random access method, a terminal, and a network device are provided. The method performed by the network device includes: sending first resource configuration information to the terminal, where the first resource configuration information is used to indicate M first frequency resources and N second frequency resources, and M and N are positive integers greater than or equal to 1; receiving a random access request sent by the terminal on a target first frequency resource; and sending a random access response on a target second frequency resource to the terminal, wherein the target first frequency resource is a free frequency resource in the M first frequency resources, and the target second frequency resource is a free frequency resource in the N second frequency resources.

20 Claims, 6 Drawing Sheets

Related U.S. Application Data continuation of application No. PCT/CN2019/088880, filed on May 28, 2019.

(56) References Cited

FOREIGN PATENT DOCUMENTS

| | | |
|---|---|---|
| CN | 106937404 A | 7/2017 |
| CN | 108024259 A | 5/2018 |
| CN | 109803443 A | 5/2019 |

OTHER PUBLICATIONS

Mediatek Inc., "BWP ambiguilty for contention-based RACH procedure", 3GPP TSG-RAN WG2 Meeting #101 R2-1803061, Mar. 3, 2018.
Huawei, "Further considerations on RACH related BWP issues", 3GPP TSG-RAN2 #101 R2-1801815, Mar. 3, 2018.
ZTE, "Discussion on initial access and mobility for NR-U", 3GPP TSG RAN WG1 Meeting #93, R1-1806463, May 25, 2018.
Second Office Action issued in related Chinese Application No. 201810645997.4, mailed May 14, 2021, 5 pages.

\* cited by examiner

RANDOM ACCESS METHOD, TERMINAL, AND NETWORK DEVICE

CROSS-REFERENCE TO RELATED APPLICATIONS

This application is a continuation of U.S. application Ser. No. 16/953,164 filed Nov. 19, 2020 (now U.S. Pat. No. 11,706,808), which is a bypass continuation of PCT Application No. PCT/CN2019/088880 filed May 28, 2019, which further claims priority to Chinese Patent Application No. 201810645997.4, filed Jun. 21, 2018, all of which are incorporated herein by reference in their entireties.

TECHNICAL FIELD

The present disclosure relates to the field of communications technologies, and in particular, to a random access method, a terminal, and a network device.

BACKGROUND

A terminal establishes a connection to a cell and achieves uplink synchronization through a random access process. The terminal can perform uplink transmission only after uplink synchronization is achieved. The random access process includes two different modes: contention based random access and non-contention based random access (may be also referred to as "contention-free random access").

When the terminal performs a random access process, a network-side device can indicate only one fixed frequency resource (for example, one Bandwidth Part (BWP) or cell) for sending various messages in the random access process. Therefore, when the frequency resource is occupied, the network-side device or the terminal cannot send a corresponding random access message (for example, a random access request and a random access response) on the frequency resource. Consequently, sending of the message is delayed, and even random access failure is caused.

SUMMARY

Embodiments of the present disclosure provide a random access method, a terminal, and a network device, to resolve the problem of random access failure caused because messages can be sent on only one fixed frequency resource in a random access process in the prior art.

To resolve the foregoing technical problem, the present disclosure is implemented as follows:

According to a first aspect, an embodiment of the present disclosure provides a random access method, applied to a terminal, where the method includes: receiving first resource configuration information sent by a network device, where the first resource configuration information is used to indicate M first frequency resources and N second frequency resources, and M and N are positive integers greater than or equal to 1; sending a random access request on a target first frequency resource to the network device; and receiving a random access response sent by the network device on a target second frequency resource, where the target first frequency resource is a free frequency resource in the M first frequency resources, and the target second frequency resource is a free frequency resource in the N second frequency resources.

According to a second aspect, an embodiment of the present disclosure provides a random access method, applied to a network device, where the method includes: sending first resource configuration information to a terminal, where the first resource configuration information is used to indicate M first frequency resources and N second frequency resources, and M and N are positive integers greater than or equal to 1; receiving a random access request sent by the terminal on a target first frequency resource; and sending a random access response on a target second frequency resource to the terminal, where the target first frequency resource is a free frequency resource in the M first frequency resources, and the target second frequency resource is a free frequency resource in the N second frequency resources.

According to a third aspect, an embodiment of the present disclosure provides a terminal, including: a receiving module, configured to receive first resource configuration information sent by a network device, where the first resource configuration information is used to indicate M first frequency resources and N second frequency resources, and M and N are positive integers greater than or equal to 1; and a sending module, configured to send a random access request on a target first frequency resource to the network device, where the receiving module is further configured to receive a random access response sent by the network device on a target second frequency resource, where the target first frequency resource is a free frequency resource in the M first frequency resources, and the target second frequency resource is a free frequency resource in the N second frequency resources.

According to a fourth aspect, an embodiment of the present disclosure provides a network device, including: a sending module, configured to send first resource configuration information to a terminal, where the first resource configuration information is used to indicate M first frequency resources and N second frequency resources, and M and N are positive integers greater than or equal to 1; and a receiving module, configured to receive a random access request sent by the terminal on a target first frequency resource, where the sending module is further configured to send a random access response on a target second frequency resource to the terminal, where the target first frequency resource is a free frequency resource in the M first frequency resources, and the target second frequency resource is a free frequency resource in the N second frequency resources.

According to a fifth aspect, an embodiment of the present disclosure provides a terminal, including a processor, a memory, and a computer program stored in the memory and capable of running on the processor, where when the computer program is executed by the processor, steps of the random access method according to the first aspect are implemented.

According to a sixth aspect, an embodiment of the present disclosure provides a network device, including a processor, a memory, and a computer program stored in the memory and capable of running on the processor, where when the computer program is executed by the processor, steps of the random access method according to the second aspect are implemented.

According to a seventh aspect, an embodiment of the present disclosure provides a computer-readable storage medium, where the computer-readable storage medium stores a computer program, and when the computer program is executed by a processor, steps of the foregoing random access method are implemented.

In the embodiments of the present disclosure, the network device allocates one or more frequency resources for various messages in a random access process, so that the frequency resources used for the messages in the random access process do not overlap and that a delay and a failure rate of the random access process are reduced.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions provided by the present disclosure may be applied to various communications systems, for example, a 5G communications system, a future evolved system, or a converged communications system, which may include a plurality of application scenarios, for example, Machine to Machine (M2M), Device to Machine (D2M), macro-micro communication, enhanced Mobile Broadband (eMBB), ultra Reliable & Low Latency Communication (uRLLC), and massive Machine Type Communication (mMTC). The scenarios include but are not limited to scenarios such as communication between terminals, or communication between network devices, or communication between a network device and a terminal. The embodiments of the present disclosure may be applied to communication between a network device and a terminal, or communication between terminals, or communication between network devices in a 5G communications system.

Figure 1:
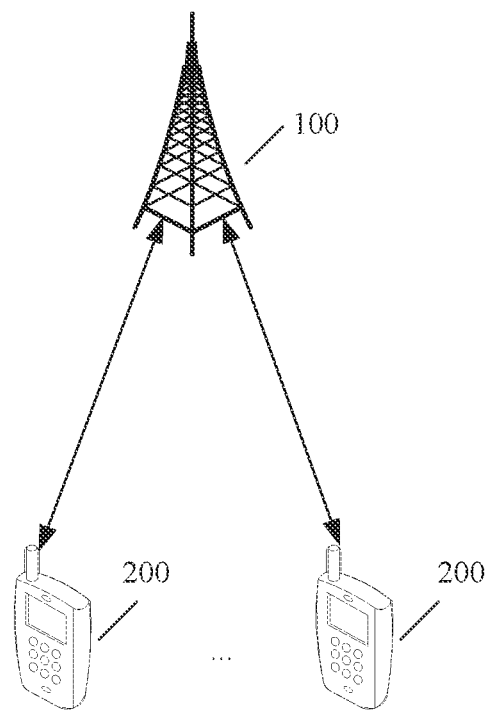
FIG. 1 is a schematic structural diagram of a communications system according to an embodiment of the present disclosure.

FIG. 1 is a possible schematic structural diagram of a communications system in an embodiment of the present disclosure. As shown in FIG. 1, the communications system includes at least one network device 100 (only one is shown in FIG. 1) and one or more terminals 200 connected to each network device 100.

The network device 100 may be a base station, a core network device, a Transmission and Reception Point (TRP), a relay station, an access point, or the like. The network device 100 may be a Base Transceiver Station (BTS) in a Global System for Mobile (GSM) communications or a Code Division Multiple Access (CDMA) network, or may be a NodeB (NB) in Wideband Code Division Multiple Access (WCDMA), or may be an evolved NodeB (eNB or eNodeB) in Long-Term Evolution (LTE). The network device 100 may also be a radio controller in a Cloud Radio Access Network (CRAN) scenario. The network device 100 may also be a network device in a 5G communications system or a network device in a future evolved network. However, the used terms do not constitute a limitation on the present disclosure.

The terminal 200 may be a wireless terminal or a wired terminal. The wireless terminal may be a device providing voice and/or other service data connectivity to a user, a handheld device having a wireless communication function, a computing device, another processing device connected to a wireless modem, an in-vehicle device, a wearable device, a terminal in a future 5G network, a terminal in a future evolved Public Land Mobile Network (PLMN) network, or the like. The wireless terminal may communicate with one or more core networks through a Radio Access Network (RAN). The wireless terminal may be a mobile terminal, such as a mobile phone (also referred to as a "cellular" phone) or a computer with a mobile terminal. For example, the wireless terminal may be a portable, pocket-sized, handheld, computer built-in, or in-vehicle mobile apparatus, which exchanges voice and/or data with the radio access network; or the wireless terminal is a device such as a Personal Communication Service (PCS) phone, a cordless telephone set, a Session Initiation Protocol (SIP) phone, a Wireless Local Loop (WLL) station, or a Personal Digital Assistant (PDA). The wireless terminal may also be a mobile device, a user equipment (UE), a UE terminal, an access terminal, a wireless communications device, a terminal unit, a terminal station, a mobile station, a mobile, a remote station, a remote terminal, a subscriber unit, a subscriber station, a user agent, a terminal apparatus, or the like. For example, FIG. 1 shows a mobile phone used as an example of a terminal in this embodiment of the present disclosure.

The term "and/or" in this specification describes only an association relationship for describing associated objects and represents that three relationships may exist. For example, A and/or B may represent the following three cases: only A, both A and B, and only B. In addition, the character "/" in this specification generally indicates an "or" relationship between associated objects; and the character "/" in a formula indicates a "division" relationship between associated objects. Unless otherwise specified, "a plurality of" in this specification indicates two or more than two.

To clearly describe the technical solutions of the embodiments of the present disclosure, terms such as "first" and "second" are used in the embodiments of the present disclosure to distinguish between same items or similar items that have basically the same functions or purposes. A person skilled in the art may understand that the terms such as "first" and "second" do not limit a quantity or an execution sequence.

It should be noted that in the embodiments of the present disclosure, terms such as "an example" or "for example" are used to represent examples, illustrations, or explanations. Any embodiment or design solution described as "exemplary" or "for example" in the embodiments of the present disclosure shall not be interpreted to be more preferential or advantageous than other embodiments or design solutions. Specifically, the terms such as "exemplary" or "for example" are intended to present related concepts in a specific manner.

Embodiment 1

Figure 2:
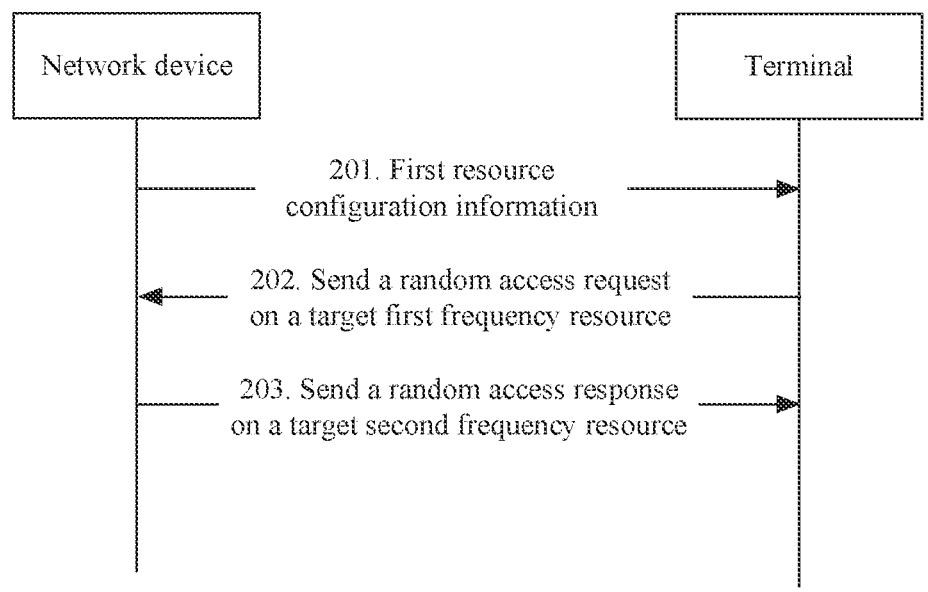
FIG. 2 is a first schematic flowchart of a random access method according to an embodiment of the present disclosure.

FIG. 2 is a schematic flowchart of a random access method according to an embodiment of the present disclosure. As shown in FIG. 2, the random access method may include the following steps.

Step 201: A network device sends first resource configuration information to a terminal.

Correspondingly, the terminal at the other end receives the first resource configuration information sent by the network device to the terminal. The network device may be a network device in the communications system shown in FIG. 1, for example, a base station; and the terminal may be a terminal device in the communications system shown in FIG. 1.

The first resource configuration information in this embodiment of the present disclosure is used to indicate M first frequency resources and N second frequency resources, and M and N are positive integers greater than or equal to 1. A random access request in this embodiment of the present disclosure includes a Physical Random Access Channel (PRACH).

A random access process includes two different modes: contention based random access and non-contention based random access (may be also referred to as "contention-free random access").

For the contention based random access and non-contention based random access, the first resource configuration information configured by the network device for the terminal includes: resource configuration information for sending a random access request and resource configuration information for receiving a random access response. The resource configuration information for sending the random access request includes parameter information of each of M first frequency resources, and is used to indicate the M first frequency resources. The resource configuration information for receiving the random access response includes parameter information of each of N second frequency resources, and is used to indicate the N second frequency resources.

Optionally, for the contention based random access, the first resource configuration information is further used to indicate K third frequency resources and L fourth frequency resources, where K and L are positive integers greater than or equal to 1. For example, the first resource configuration information includes resource configuration information for sending uplink transmission and resource configuration information for receiving a contention resolution message. The resource configuration information for sending the uplink transmission includes parameter information of each of K third frequency resources, and is used to indicate the K third frequency resources. The resource configuration information for receiving the contention resolution message includes parameter information of each of L fourth frequency resources, and is used to indicate the L fourth frequency resources.

In this embodiment of the present disclosure, parameter information of the frequency resources (that is, the first frequency resources, second frequency resources, third frequency resources, and fourth frequency resources) includes at least one of the following: a BWP identity (such as BWP1), a cell identity (such as Cell1), a cell group identity (for example, Secondary Cell Group (SCG)), a frequency identity, a bandwidth identity (such as 5 MHz), and a carrier identity. For example, for the carrier identity, when a plurality of uplink carriers are configured for a cell, the first resource configuration information needs to indicate a specific uplink carrier; or when one uplink carrier is configured for a cell, the first resource configuration information needs to indicate whether the uplink carrier is a secondary uplink carrier; or when a plurality of downlink carriers are configured for a cell, the first resource configuration information needs to indicate a specific downlink carrier.

It should be noted that M and N may be the same or may be different. This is not limited herein. In addition, the M first frequency resources and the N second frequency resources may be same frequency resources, or may be different frequency resources. This is not limited herein. Assuming that the M first frequency resources and the N second frequency resources are the same frequency resources, that is, the network device allocates the same frequency resources for each message in the random access process, a quantity of frequency resources indicated by the first resource configuration information is greater than or equal to 2. Likewise, for the contention based random access process, values of M, N, K, and L may be the same or may be different. The M first frequency resources, N second frequency resources, K third frequency resources, and L fourth frequency resources may be same frequency resources, or may be different frequency resources. This is not limited herein.

Step 202: The terminal sends a random access request on a target first frequency resource to the network device.

Correspondingly, the network device at the other end receives the random access request sent by the terminal to the network device on the target first frequency resource.

The target first frequency resource is a free frequency resource in the M first frequency resources.

In this embodiment of the present disclosure, when the terminal sends the random access request to the network device, the terminal may select one or more first frequency resources from the M first frequency resources to monitor whether a corresponding frequency is free. For example, if one first frequency resource is free, the terminal sends the random access request on the frequency resource; or if a plurality of first frequency resources are free, the terminal may select one or more first frequency resources from the free first frequency resources based on a predetermined rule to send the random access request.

Optionally, before step 202, the following steps are further included in this embodiment of the present disclosure.

Step 202a: The terminal monitors a part or an entirety of first frequency resources in the M first frequency resources.

Step 202b: If the terminal detects that Y first frequency resources in the some or all M first frequency resources are free, the terminal uses at least one of the Y first frequency resources as the target first frequency resource.

Y is less than or equal to a quantity of the some or all first frequency resources, and Y is a positive integer greater than or equal to 1.

Further optionally, in this embodiment of the present disclosure, the foregoing step 202a specifically includes the following content:

Step 202a1: The terminal monitors the some or all first frequency resources in the M first frequency resources according to a first predetermined rule; and/or in this embodiment of the present disclosure, the foregoing step 202b specifically includes the following content:

Step 202b1: If the terminal detects that Y first frequency resources in the some or all M first frequency resources are free, the terminal selects at least one of the Y first frequency resources as the target first frequency resource according to a second predetermined rule.

The first predetermined rule includes at least one of the following: first frequency resources satisfying a first condition are monitored, and a quantity of monitored first frequency resources is less than or equal to a first threshold. The second predetermined rule includes at least one of the following: first frequency resources satisfying the first condition are selected, and a quantity of selected first frequency resources is less than or equal to a third threshold. The first condition is that a frequency measurement value corresponding to the first frequency resource is greater than or equal to a second threshold.

For example, the first predetermined rule and the second predetermined rule are predefined (for example, specified by a protocol) or are configured by the network device for the terminal. This is not limited in the present disclosure.

For example, the second threshold may be configured independently based on a frequency corresponding to each first frequency resource. For example, a corresponding second threshold is configured independently for the frequency corresponding to each first frequency resource, or one second threshold may be configured for the M first frequency resources. This is not limited in the present disclosure.

For example, the first threshold is a maximum value of a quantity of frequency resources to be selected and monitored that is configured by the network device for the terminal, and may be a value that is less than or equal to M. The third threshold is a maximum value of a quantity of target first frequency resources to be selected that is configured by the network device for the terminal, and is less than or equal to Y.

For example, the network device may configure, for the terminal by sending configuration information to the terminal, the second threshold corresponding to the M first frequency resources, and the maximum value of the quantity of the frequency resources to be selected and monitored. The configuration information may be sent to the terminal by using one of the following messages: a Physical Downlink Control Channel (PDCCH) and Radio Resource Control (RRC) signaling.

For example, if one first frequency resource is selected as the target first frequency resource, the second predetermined rule includes any one of the following: a free first frequency resource is selected randomly, a first frequency resource with best channel quality (such as best Reference Signal Received Power (RSRP)) in the Y first frequency resources is selected, and a first frequency resource satisfying the first condition is selected randomly. If the Y first frequency resources include a plurality of first frequency resources with best channel quality, the terminal needs to select a first frequency resource randomly from the plurality of first frequency resources with best channel quality; or if the Y first frequency resources include a plurality of first frequency resources satisfying the first condition, the terminal needs to select a first frequency resource with best channel quality from the plurality of first frequency resources.

For example, if a plurality of first frequency resources are selected as the target first resources, the second predetermined rule includes either of the following: the Y first frequency resources are selected, and all first frequency resources satisfying the first condition are selected from the Y first frequency resources.

Step 203: The network device sends a random access response on a target second frequency resource to the terminal.

Correspondingly, the terminal at the other end receives the random access response sent by the network device to the terminal on the target second frequency resource.

The target second frequency resource is a free frequency resource in the N second frequency resources.

In this embodiment of the present disclosure, after the network device receives the random access request sent by the terminal, if there is one free second frequency resource in the N second frequency resources, the network device sends the random access response on the free second frequency resource (that is, the target second frequency resource); or if there are a plurality of free second frequency resources in the N second frequency resources, the network device may select one or more free second frequency resources (that is, the target second frequency resource) from the plurality of free second frequency resource to send the random access response.

In this embodiment of the present disclosure, the random access response includes at least one of the following information: identity information of the random access request (such as a Random Access Preamble Identifier (RAPID)), uplink timing advance information (such as timing advance command), uplink grant (UL Grant) information, backoff information (such as backoff indicator), and temporary terminal identity information (such as Cell Radio Network Temporary Identifier (C-RNTI)).

In this embodiment of the present disclosure, for the non-contention based random access process, after receiving the random access response, the terminal determines, based on the random access response, whether the random access process is successful. Specifically, if the terminal successfully receives any random access response, the terminal determines that the random access process is successful. If the terminal does not successfully receive any random access response, the terminal determines that the random access process fails. In this case, the terminal may determine, based on the backoff information in the random access response, a time of sending a random access response next time.

Optionally, in this embodiment of the present disclosure, for the contention based random access, the random access response includes second resource configuration information, and the second resource configuration information is used to indicate K third frequency resources and L fourth frequency resources. For example, the second resource configuration information includes resource configuration information for sending uplink transmission and resource configuration information for receiving a contention resolution message. The resource configuration information for sending the uplink transmission includes parameter information of each of K third frequency resources, and is used to indicate M first frequency resources. The resource configuration information for receiving the contention resolution message includes parameter information of each of L fourth frequency resources, and is used to indicate the L fourth frequency resources.

Optionally, in this embodiment of the present disclosure, after sending the random access request on the target first frequency resource, the terminal monitors, in a fixed window (that is, a Random Access Response (RAR) window)), where the RAR window is used to indicate a time range for receiving the random access response), the random access response sent by the network device to the terminal. For example, the network device sends a plurality of random access responses on a plurality of target second frequency resources to the terminal, where one random access response is sent on one target second frequency resource. Therefore, each random access response may correspond to one RAR window, or a plurality of random access responses may correspond to one RAR window.

Optionally, in this embodiment of the present disclosure, after sending the random access request on the target first frequency resource, the terminal calculates, based on parameter information of each second frequency resource, a Random Access-Radio Network Temporary Identifier (RA-RNTI) of a frequency corresponding to each second frequency resource, then determines, based on the RA-RNTI of the frequency corresponding to each second frequency resource, a RAR window of the frequency corresponding to each second frequency resource, and therefore monitors, in the RAR windows, the random access response sent by the network device to the terminal.

The following uses three examples to describe a process of calculating the RA-RNTI of the frequency corresponding to the second frequency resource.

RA-RNTI1=1+$s$_id+14−$t$_id+14×80×$f$_id+14×80×8×
bwp_id+14×80×8×maxBWP×ul_carrier_id.     Example 1:

RA-RNTI2=1+$s$_id+14×$t$_id+14×80×$f$_id+14×80×8×
ul_carrier_id+14×80×8×2×carrier_id.     Example 2:

RA-RNTI3=1+$s$_id+14×$t$_id+14×80×$f$_id+14×80×8×
bwp_id+14×80×8×maxBWP×ul_carrier_id+14×
80×8×maxBWP×2×carrier_id.     Example 3:

In the examples, s_id is an identity of a first Orthogonal Frequency Division Multiplexing (OFDM) symbol of a PRACH (0≤s_id≤14); t_id is an identity of a first slot (that is, a slot) of the PRACH in a first system frame (0≤t_id<80); f_id is a frequency domain (for example, in one BWP) identity of the PRACH (0≤f_id<8); bwp_id is a BWP identity of the PRACH (0≤bwp_id<maxBWP); maxBWP is a maximum quantity of BWPs; ul_carrier_id is an uplink carrier identity of the PRACH (for example, "0" is a Normal Uplink (NUL) carrier, and "1" is a Supplement Uplink (SUL) carrier); and carrier_id is a cell identity or a carrier identity of the PRACH (0≤carrier<maxCarrier), where max-Carrier is a maximum quantity of cells or carriers.

Optionally, before step 203, the following steps are further included in this embodiment of the present disclosure.

Step 203a: The network device monitors a part or an entirety of second frequency resources in the N second frequency resources.

Step 203b: If the network device detects that X second frequency resources in the some or all second frequency resources are free, the network device uses at least one of the X second frequency resources as the target second frequency resource.

X is less than or equal to N, and X is a positive integer greater than or equal to 1.

Further optionally, in this embodiment of the present disclosure, the foregoing step 203a specifically includes the following content:

Step 203a1: The terminal monitors the some or all second frequency resources in the N second frequency resources according to a fifth predetermined rule; and/or in this embodiment of the present disclosure, the foregoing step 203b specifically includes the following content:

Step 203b1: If the network device detects that X second frequency resources in the some or all second frequency resources are free, the network device selects at least one of the X second frequency resources as the target second frequency resource according to a sixth predetermined rule.

The fifth predetermined rule includes at least one of the following: second frequency resources satisfying a first condition are monitored, and a quantity of monitored second frequency resources is less than or equal to a sixth threshold; and the sixth predetermined rule includes at least one of the following: second frequency resources satisfying the first condition are selected, and a quantity of selected second frequency resources is less than or equal to a seventh threshold; where the first condition is that a frequency measurement value corresponding to the second frequency resource is greater than or equal to a second threshold.

For example, the fifth predetermined rule and the sixth predetermined rule are predefined or are configured by the network device for the terminal. This is not limited in the present disclosure.

For example, the second threshold may be configured independently based on a frequency corresponding to each second frequency resource. For example, a corresponding second threshold is configured independently for the frequency corresponding to each second frequency resource, or one second threshold may be configured for the N second frequency resources. This is not limited in the present disclosure.

For example, the sixth threshold is a maximum value of a quantity of frequency resources to be selected and monitored that is configured by the network device for the terminal, and may be a value that is less than or equal to N. The seventh threshold is a maximum value of a quantity of target second frequency resources to be selected that is configured by the network device for the terminal, and is less than or equal to X. For example, the network device may configure, for the terminal by sending configuration information to the terminal, the second threshold, the sixth threshold, and the seventh threshold corresponding to the N second frequency resources. The configuration information may be sent to the terminal by using one of the following messages: a PDCCH and RRC signaling.

In the random access method provided by this embodiment of the present disclosure, the network device allocates one or more frequency resources for various messages (such as the random access request and the random access response) in the random access process, so that the frequency resources used for the messages in the random access process do not overlap and that a delay and a failure rate of the random access process are reduced.

Embodiment 2

Figure 3:
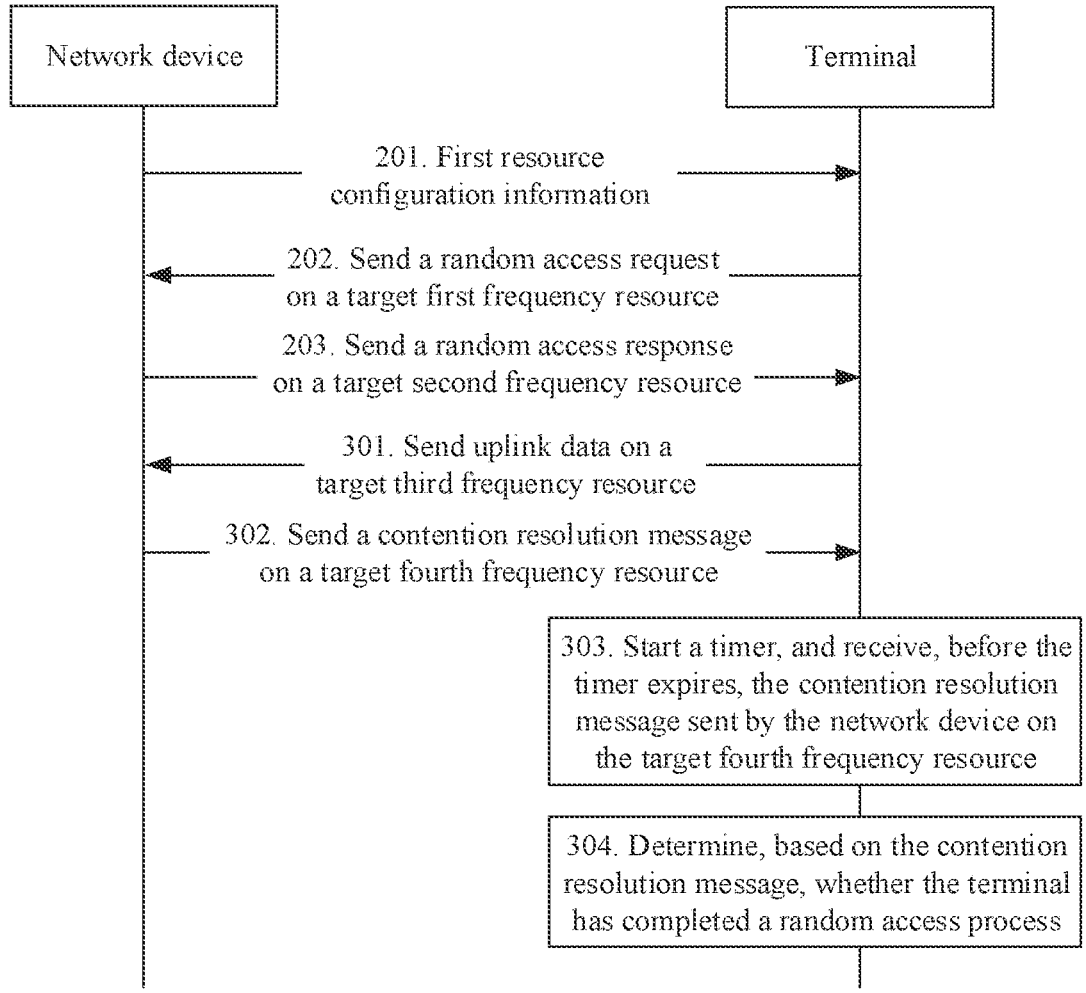
FIG. 3 is a second schematic flowchart of a random access method according to an embodiment of the present disclosure.

Embodiment 2 of the present disclosure is mainly intended for a contention based random access process. The solution provided by Embodiment 2 of the present disclosure is implemented on a basis of the solution of Embodiment 1. Specifically, as shown in FIG. 3, when the first resource configuration information or random access response in Embodiment 1 of the present disclosure is used to indicate K third frequency resources and L fourth frequency resources, with reference to step 201 to step 203 in Embodiment 1, the method in this embodiment of the present disclosure further includes the following step 301 to step 304.

Step 301: The terminal sends uplink data on a target third frequency resource to the network device.

Correspondingly, the network device at the other end receives the uplink data sent by the terminal on the target third frequency resource.

The target third frequency resource is a free frequency resource in the K third frequency resources.

Optionally, before step 301, the following steps are further included in this embodiment of the present disclosure:

Step 301a: The terminal monitors a part or an entirety of third frequency resources in the K third frequency resources.

Step 301b: If the terminal detects that H third frequency resources in the some or all third frequency resources are free, the terminal uses at least one of the H third frequency resources as the target third frequency resource.

H is less than or equal to a quantity of the some or all third frequency resources, and H is a positive integer greater than or equal to 1.

Further optionally, in this embodiment of the present disclosure, the foregoing step 301a specifically includes the following content:

Step 301a1: The terminal monitors the some or all third frequency resources in the K third frequency resources according to a third predetermined rule; and/or in this embodiment of the present disclosure, the foregoing step 301b specifically includes the following content:

Step 301b1: The terminal selects at least one of the H third frequency resources as the target third frequency resource according to a fourth predetermined rule.

The third predetermined rule includes at least one of the following: third frequency resources satisfying a first condition are monitored, and a quantity of monitored third frequency resources is less than or equal to a fourth threshold; and the fourth predetermined rule includes at least one of the following: third frequency resources satisfying the first condition are selected, and a quantity of selected third frequency resources is less than or equal to a fifth threshold; where the first condition is that a frequency measurement value corresponding to the third frequency resource is greater than or equal to a second threshold.

For example, the third predetermined rule and the fourth predetermined rule are predefined or are configured by the network device for the terminal. This is not limited in the present disclosure.

For example, the second threshold may be configured independently based on a frequency corresponding to each third frequency resource. For example, a corresponding second threshold is configured independently for the frequency corresponding to each third frequency resource, or one second threshold may be configured for the K third frequency resources. This is not limited in the present disclosure.

For example, the fourth threshold is a maximum value of a quantity of frequency resources to be selected and monitored that is configured by the network device for the terminal, and may be a value that is less than or equal to K. The fifth threshold is a maximum value of a quantity of target third frequency resources to be selected that is configured by the network device for the terminal, and is less than or equal to H. For example, the network device may configure, for the terminal by sending configuration information to the terminal, the second threshold, the fourth threshold, and the fifth threshold corresponding to the K third frequency resources. The configuration information may be sent to the terminal by using one of the following messages: a PDCCH and RRC signaling.

Step 302: The network device sends a contention resolution message on a target fourth frequency resource to the terminal.

The target fourth frequency resource is a free frequency resource in the L fourth frequency resources; and the contention resolution message is used to indicate whether the terminal completes the random access process.

Optionally, before step 302, the following steps are further included in this embodiment of the present disclosure:

Step 302a: The network device monitors a part or an entirety of fourth frequency resources in the L fourth frequency resources.

Step 203b: If the network device detects that J fourth frequency resources in the some or all fourth frequency resources are free, the network device uses at least one of the J fourth frequency resources as the target fourth frequency resource.

J is less than or equal to L, and J is a positive integer greater than or equal to 1.

Further optionally, in this embodiment of the present disclosure, the foregoing step 302a specifically includes the following content:

Step 302a1: The network device monitors the some or all fourth frequency resources in the L fourth frequency resources according to a seventh predetermined rule; and/or in this embodiment of the present disclosure, the foregoing step 302b specifically includes the following content:

Step 302b1: The network device selects at least one of the J fourth frequency resources as the target fourth frequency resource according to an eighth predetermined rule.

The seventh predetermined rule includes at least one of the following: fourth frequency resources satisfying a first condition are monitored, and a quantity of monitored fourth frequency resources is less than or equal to an eighth threshold; and the eighth predetermined rule includes at least one of the following: fourth frequency resources satisfying the first condition are selected, and a quantity of selected fourth frequency resources is less than or equal to a ninth threshold; where the first condition is that a frequency measurement value corresponding to the fourth frequency resource is greater than or equal to a second threshold.

For example, the seventh predetermined rule and the eighth predetermined rule are predefined or are configured by the network device for the terminal. This is not limited in the present disclosure.

For example, the second threshold may be configured independently based on a frequency corresponding to each fourth frequency resource. For example, a corresponding second threshold is configured independently for the frequency corresponding to each fourth frequency resource, or one second threshold may be configured for the L fourth frequency resources. This is not limited in the present disclosure.

For example, the eighth threshold is a maximum value of a quantity of frequency resources to be selected and monitored that is configured by the network device for the terminal, and may be a value that is less than or equal to L. The ninth threshold is a maximum value of a quantity of target fourth frequency resources to be selected that is configured by the network device for the terminal, and is less than or equal to J. For example, the network device may configure, for the terminal by sending configuration information to the terminal, the second threshold, the eighth threshold, and the ninth threshold corresponding to the J fourth frequency resources. The configuration information may be sent to the terminal by using the following messages: a PDCCH and RRC signaling.

Step 303: The terminal starts a timer, and receives, before the timer expires, the contention resolution message sent by the network device on the target fourth frequency resource.

Optionally, in this embodiment of the present disclosure, one piece of uplink data is correspondingly sent on each target third frequency resource, and correspondingly, the process of starting a timer in step 303 specifically includes the following content:

Step 303a: Start the timer according to a ninth predetermined rule.

The ninth predetermined rule includes at least one of the following: the timer is started at a time of sending the first piece of uplink data, the timer is started at a time of sending the last piece of uplink data, and the timer is started at a time of sending each piece of uplink data.

Step 304: The terminal determines, based on the contention resolution message, whether the terminal completes the random access process.

In this embodiment of the present disclosure, after receiving the contention resolution message, the terminal determines, based on the contention resolution message, whether the random access process is successful. Specifically, if the terminal successfully receives any contention resolution message, the terminal determines that the random access process is successful. If the terminal does not successfully receive any contention resolution message, the terminal determines that the random access process fails. In this case, the terminal may determine, based on the backoff information in the random access response, a time of sending a random access response next time.

In the random access method provided by this embodiment of the present disclosure, for the contention based random access process, the network device allocates one or more frequency resources for various messages (such as a random access request, a random access response, uplink data, and a contention resolution message) in the random access process, so that the frequency resources used for the messages in the random access process do not overlap and that a delay and a failure rate of the random access process are reduced.

Embodiment 3

Figure 4:
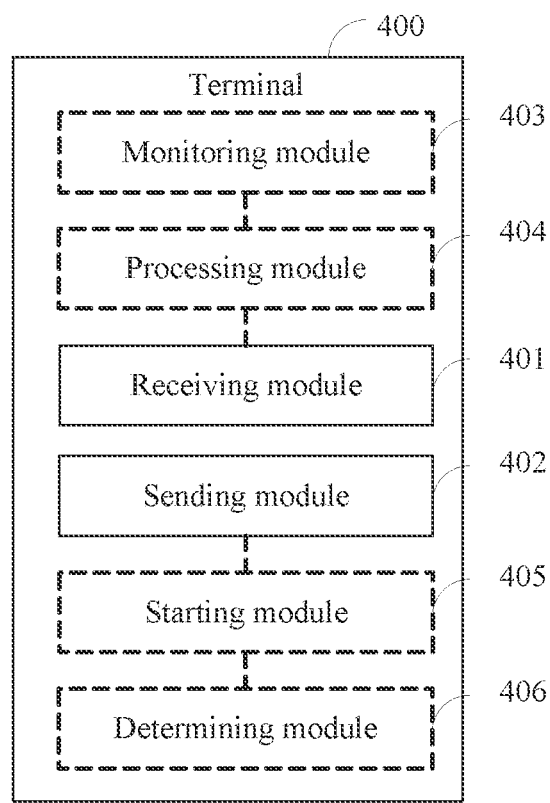
FIG. 4 is a first schematic structural diagram of a terminal according to an embodiment of the present disclosure.

As shown in FIG. 4, this embodiment of the present disclosure provides a terminal 400, where the terminal 400 includes a receiving module 401 and a sending module 402.

The receiving module 401 is configured to receive first resource configuration information sent by a network device, where the first resource configuration information is used to indicate M first frequency resources and N second frequency resources, and M and N are positive integers greater than or equal to 1.

The sending module 402 is configured to send a random access request on a target first frequency resource to the network device.

The receiving module 401 is further configured to receive a random access response sent by the network device on a target second frequency resource.

The target first frequency resource is a free frequency resource in the M first frequency resources, and the target second frequency resource is a free frequency resource in the N second frequency resources.

Optionally, as shown in FIG. 4, the terminal 400 further includes a monitoring module 403 and a processing module 404.

The monitoring module 403 is configured to monitor a part or an entirety of first frequency resources in the M first frequency resources; and the processing module 404 is configured to: if the monitoring module 403 detects that Y first frequency resources in the some or all first frequency resources are free, use at least one of the Y first frequency resources as the target first frequency resource, where Y is less than or equal to a quantity of the some or all first frequency resources, and Y is a positive integer greater than or equal to 1.

Further optionally, the monitoring module 403 is specifically configured to monitor the some or all first frequency resources in the M first frequency resources according to a first predetermined rule; and/or the processing module 404 is specifically configured to select at least one of the Y first frequency resources as the target first frequency resource according to a second predetermined rule.

The first predetermined rule includes at least one of the following: first frequency resources satisfying a first condition are monitored, and a quantity of monitored first frequency resources is less than or equal to a first threshold; and the second predetermined rule includes at least one of the following: first frequency resources satisfying the first condition are selected, and a quantity of selected first frequency resources is less than or equal to a third threshold; where the first condition is that a frequency measurement value corresponding to the first frequency resource is greater than or equal to a second threshold, the first threshold is less than or equal to M, and the third threshold is less than or equal to Y.

Optionally, the first resource configuration information is further used to indicate K third frequency resources and L fourth frequency resources; or the random access response includes second resource configuration information, and the second resource configuration information is used to indicate K third frequency resources and L fourth frequency resources, where K and L are positive integers greater than or equal to 1.

Optionally, the terminal 400 further includes a starting module 405 and a determining module 406.

The sending module 402 is further configured to send uplink data on a target third frequency resource to the network device; the starting module 405 is configured to start a timer; before the timer started by the starting module 405 expires, the receiving module 401 is further configured to receive a contention resolution message sent by the network device on a target fourth frequency resource; and the determining module 406 is configured to determine, based on the contention resolution message, whether the terminal 400 has successfully completed a random access process.

The target third frequency resource is a free frequency resource in the K third frequency resources, and the target fourth frequency resource is a free frequency resource in the L fourth frequency resources.

Optionally, the monitoring module 403 is configured to monitor a part or an entirety of third frequency resources in the K third frequency resources; and the processing module 404 is configured to: if the monitoring module 403 detects that H third frequency resources in the some or all frequency resources are free, use at least one of the H third frequency resources as the target third frequency resource, where H is less than or equal to a quantity of the some or all third frequency resources, and H is a positive integer greater than or equal to 1.

Further optionally, the monitoring module 403 is specifically configured to monitor the some or all third frequency resources in the K third frequency resources according to a third predetermined rule; and/or the processing module 404 is specifically configured to select at least one of the H third frequency resources as the target third frequency resource according to a fourth predetermined rule.

The third predetermined rule includes at least one of the following: third frequency resources satisfying a first condition are monitored, and a quantity of monitored third frequency resources is less than or equal to a fourth threshold; and the fourth predetermined rule includes at least one of the following: third frequency resources satisfying the first condition are selected, and a quantity of selected third frequency resources is less than or equal to a fifth threshold; where the first condition is that a frequency measurement value corresponding to the third frequency resource is greater than or equal to a second threshold, the fourth threshold is less than or equal to K, and the fifth threshold is less than or equal to H.

Optionally, one piece of uplink data is correspondingly sent on each target third frequency resource; and the starting module 405 is specifically configured to start the timer according to a ninth predetermined rule, where the ninth predetermined rule includes at least one of the following: the timer is started at a time of sending the first piece of uplink data, the timer is started at a time of sending the last piece of uplink data, and the timer is started at a time of sending each piece of uplink data.

The terminal provided by this embodiment of the present disclosure receives one or more frequency resources allocated by the network device for various messages (such as the random access request and the random access response) in the random access process, so that the frequency resources used for the messages in the random access process do not overlap and that a delay and a failure rate of the random access process are reduced.

The terminal provided by this embodiment of the present disclosure can implement the process of the foregoing method embodiment shown in FIG. 2 or FIG. 3. To avoid repetition, details are not described again herein.

Embodiment 4

Figure 5:
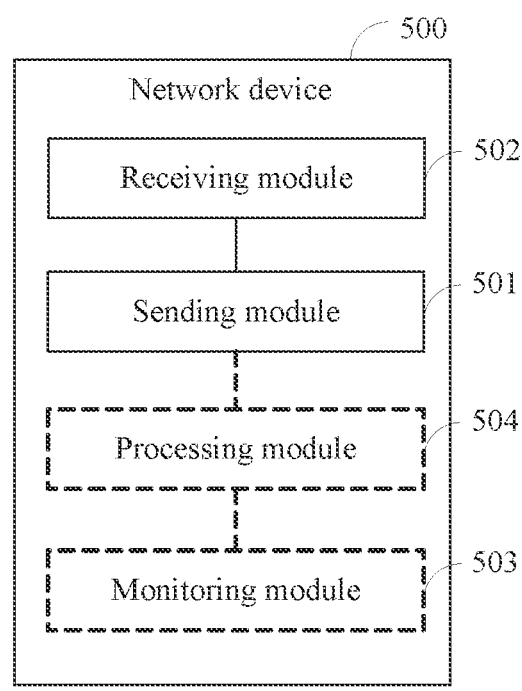
FIG. 5 is a first schematic structural diagram of a network device according to an embodiment of the present disclosure.

FIG. 5 is a schematic structural diagram of a network device for implementing the embodiments of the present disclosure. The network device 500 includes a sending module 501 and a receiving module 502.

The sending module 501 is configured to send first resource configuration information to a terminal, where the first resource configuration information is used to indicate M first frequency resources and N second frequency resources, and M and N are positive integers greater than or equal to 1.

The receiving module 502 is configured to receive a random access request sent by the terminal on a target first frequency resource.

The sending module 501 is further configured to send a random access response on a target second frequency resource to the terminal.

The target first frequency resource is a free frequency resource in the M first frequency resources, and the target second frequency resource is a free frequency resource in the N second frequency resources.

Optionally, as shown in FIG. 5, the network device 500 further includes a monitoring module 503 and a processing module 504.

The monitoring module 503 is configured to monitor a part or an entirety of second frequency resources in the N second frequency resources; and the processing module 504 is configured to: if the monitoring module 503 detects that X second frequency resources in the some or all second frequency resources are free, use at least one of the X second frequency resources as the target second frequency resource, where X is less than or equal to a quantity of the some or all second frequency resources, and X is a positive integer greater than or equal to 1.

Further optionally, the monitoring module 503 is specifically configured to monitor the some or all second frequency resources in the N second frequency resources according to a fifth predetermined rule; and/or the processing module 504 is specifically configured to select at least one of the X second frequency resources as the target second frequency resource according to a sixth predetermined rule.

The fifth predetermined rule includes at least one of the following: second frequency resources satisfying a first condition are monitored, and a quantity of monitored second frequency resources is less than or equal to a sixth threshold; and the sixth predetermined rule includes at least one of the following: second frequency resources satisfying the first condition are selected, and a quantity of selected second frequency resources is less than or equal to a seventh threshold; where the first condition is that a frequency measurement value corresponding to the second frequency resource is greater than or equal to a second threshold, the sixth threshold is less than or equal to N, and the seventh threshold is less than or equal to X.

Optionally, the first resource configuration information is further used to indicate K third frequency resources and L fourth frequency resources; or the random access response includes second resource configuration information, and the second resource configuration information is used to indicate K third frequency resources and L fourth frequency resources.

Optionally, the receiving module 502 is further configured to receive uplink data sent by the terminal on a target third frequency resource; and the sending module 501 is further configured to send a contention resolution message on a target fourth frequency resource to the terminal, where the contention resolution message is used to indicate whether the terminal has successfully completed a random access process; and the target third frequency resource is a free frequency resource in the K third frequency resources, and the target fourth frequency resource is a free frequency resource in the L fourth frequency resources.

Optionally, the monitoring module 503 is configured to monitor a part or an entirety of fourth frequency resources in the L fourth frequency resources; and the processing module 504 is configured to: if the monitoring module 503 detects that J fourth frequency resources in the some or all fourth frequency resources are free, use at least one of the J fourth frequency resources as the target fourth frequency resource, where J is less than or equal to a quantity of the some or all fourth frequency resources, and J is a positive integer greater than or equal to 1.

Further optionally, the monitoring module 503 is specifically configured to monitor the some or all fourth frequency resources in the L fourth frequency resources according to a seventh predetermined rule; and/or the processing module 504 is specifically configured to select at least one of the J fourth frequency resources as the target fourth frequency resource according to an eighth predetermined rule.

The seventh predetermined rule includes at least one of the following: fourth frequency resources satisfying a first condition are monitored, and a quantity of monitored fourth frequency resources is less than or equal to an eighth threshold; and the eighth predetermined rule includes at least one of the following: fourth frequency resources satisfying the first condition are selected, and a quantity of selected fourth frequency resources is less than or equal to a ninth threshold; where the first condition is that a frequency measurement value corresponding to the fourth frequency resource is greater than or equal to a second threshold, the eighth threshold is less than or equal to L, and the ninth threshold is less than or equal to J.

The network device provided by this embodiment of the present disclosure allocates one or more frequency resources for various messages (such as the random access request and the random access response) in the random access process, so that the frequency resources used for the messages in the random access process do not overlap and that a delay and a failure rate of the random access process are reduced.

The network device provided by this embodiment of the present disclosure can implement the process of the foregoing method embodiment shown in FIG. 2 or FIG. 3. To avoid repetition, details are not described again herein.

Embodiment 5

Figure 6:
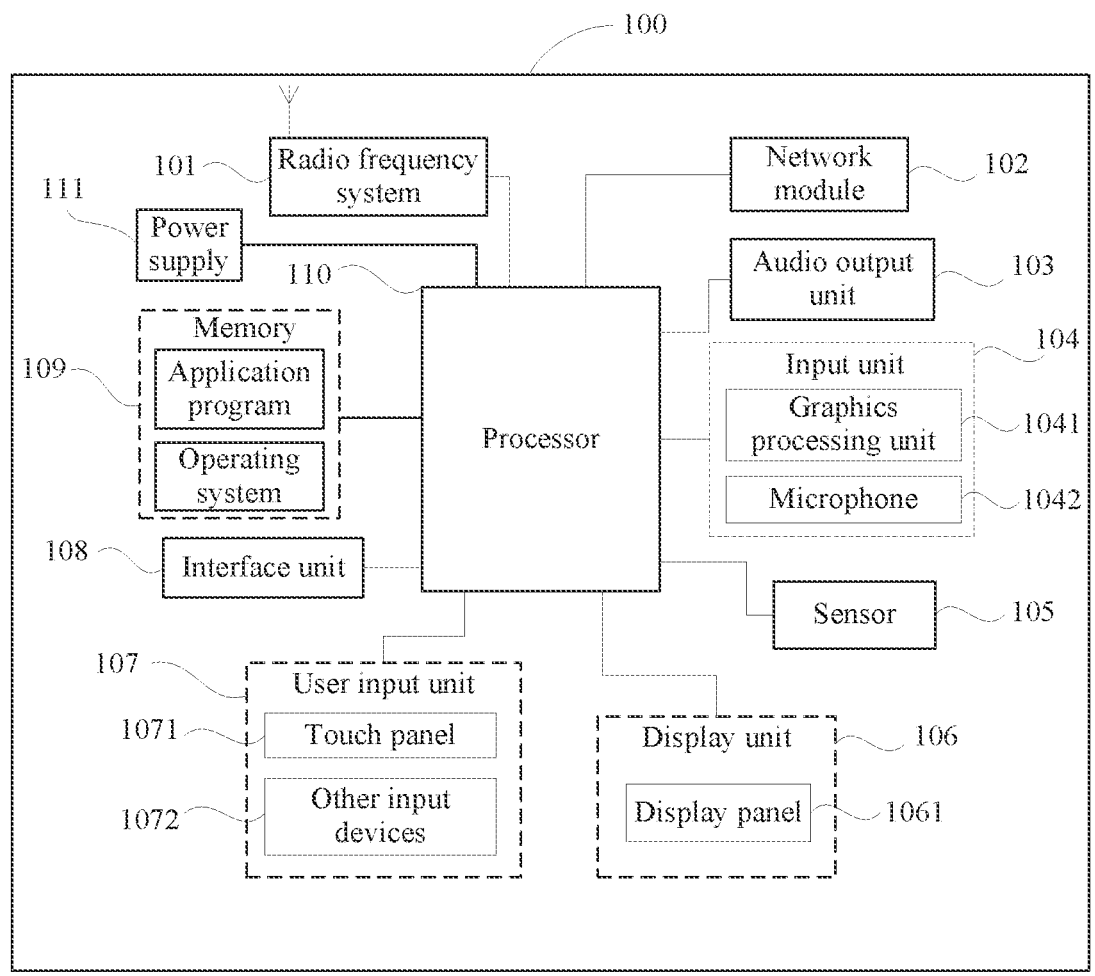
FIG. 6 is a second schematic structural diagram of a terminal according to an embodiment of the present disclosure.

FIG. 6 is a schematic diagram of a hardware structure of a terminal for implementing the embodiments of the present disclosure. The terminal 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the terminal 100 shown in FIG. 6 does not constitute a limitation on the terminal. The terminal 100 may include more or fewer components than those shown in the figure, or combine some of the components, or arrange the components differently. In this embodiment of the present disclosure, the terminal 100 includes but is not limited to a mobile phone, a tablet computer, a notebook computer, a palmtop computer, an in-vehicle terminal, a wearable device, a pedometer, or the like.

The user input unit 107 is configured to receive first resource configuration information sent by a network device, where the first resource configuration information is used to indicate M first frequency resources and N second frequency resources, and M and N are positive integers greater than or equal to 1. The user input unit 107 is further configured to send a random access request on a target first frequency resource to the network device, and receive a random access response sent by the network device on a target second frequency resource, where the target first frequency resource is a free frequency resource in the M first frequency resources, and the target second frequency resource is a free frequency resource in the N second frequency resources.

The terminal provided by this embodiment of the present disclosure receives one or more frequency resources allocated by the network device for various messages (such as the random access request and the random access response) in a random access process, so that the frequency resources used for the messages in the random access process do not overlap and that a delay and a failure rate of the random access process are reduced.

It should be understood that in this embodiment of the present disclosure, the radio frequency unit 101 may be configured to receive and send signals in an information reception or transmission or call process. Specifically, after receiving downlink data from a base station, the radio frequency unit 101 sends the downlink data to the processor 110 for processing, and in addition, sends uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and other devices through a wireless communications system.

The terminal 100 provides wireless broadband internet access for a user by using the network module 102, for example, helps the user send and receive e-mails, browse web pages, and access streaming media.

The audio output unit 103 may convert audio data received by the radio frequency unit 101 or the network module 102 or stored in the memory 109 into an audio signal, and output the audio signal as a sound. In addition, the audio output unit 103 may further provide an audio output (for example, a call signal reception sound or a message reception sound) related to a specific function performed by the terminal 100. The audio output unit 103 includes a speaker, a buzzer, a telephone receiver, and the like.

The input unit 104 is configured to receive an audio or video signal. The input unit 104 may include a Graphics Processing Unit (GPU) 1041 and a microphone 1042. The graphics processing unit 1041 processes image data of a still picture or a video obtained by an image capture apparatus (for example, a camera) in an image capture mode or a video capture mode. A processed image frame may be displayed on the display unit 106. An image frame processed by the graphics processing unit 1041 may be stored in the memory 109 (or another storage medium) or sent by the radio frequency unit 101 or the network module 102. The microphone 1042 can receive a sound and can process such sound into audio data. The processed audio data may be converted in a telephone call mode into a format that can be sent by the radio frequency unit 101 to a mobile communications base station, for outputting.

The terminal 100 further includes at least one sensor 105, for example, an optical sensor, a motion sensor, and another sensor. Specifically, the optical sensor includes an ambient light sensor and a proximity sensor. The ambient light sensor may adjust luminance of a display panel 1061 based on brightness of ambient light. The proximity sensor may turn off and/or backlight the display panel 1061 when the terminal 100 moves to an ear. As a type of motion sensor, an accelerometer sensor may detect acceleration magnitudes in all directions (generally three axes), and when the accelerometer sensor is stationary, may detect a magnitude and a direction of gravity, and may be configured for terminal posture recognition (such as switching between landscape and portrait, related games, and magnetometer posture calibration), vibration recognition related functions (such as a pedometer and stroke), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided for the user. The display unit 106 may include the display panel 1061. The display panel 1061 may be configured in a form of a Liquid Crystal Display (LCD), an Organic Light-Emitting Diode (OLED), or the like.

The user input unit 107 may be configured to receive input digit or character information and generate key signal input related to user setting and function control of the terminal 100. Specifically, the user input unit 107 includes a touch panel 1071 and other input devices 1072. The touch panel 1071, also referred to as a touchscreen, may capture a touch operation performed by the user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into point coordinates, sends the point coordinates to the processor 110, and receives and executes a command sent by the processor 110. In addition, the touch panel 1071 may be implemented in a plurality of forms, for example, a resistive, capacitive, infrared, or surface acoustic wave touch panel. The user input unit 107 may further include the other input devices 1072 in addition to the touch panel 1071. Specifically, the other input devices 1072 may include but are not limited to a physical keyboard, a function key (such as a volume control key or a power on/off key), a trackball, a mouse, a joystick, and the like. Details are not described herein.

Further, the touch panel 1071 may cover the display panel 1061. After the touch panel 1071 detects a touch operation on or near the touch panel, the touch panel 1071 transmits the touch operation to the processor 110 to determine a type of a touch event. Then the processor 110 provides a corresponding visual output on the display panel 1061 based on the type of the touch event. Although the touch panel 1071 and the display panel 1061 are used as two independent components to implement input and output functions of the terminal 100 in FIG. 6, the touch panel 1071 and the display panel 1061 may be integrated to implement the input and output functions of the terminal 100 in some embodiments. This is not specifically limited herein.

The interface unit 108 is an interface for connecting an external apparatus to the terminal 100. For example, the external apparatus may include a wired or wireless headphone port, an external power (or battery charger) port, a wired or wireless data port, a memory card port, a port for connecting an apparatus provided with an identification module, an audio input/output (I/O) port, a video I/O port, an earphone port, and the like. The interface unit 108 may be configured to receive an input (for example, data information or power) from an external apparatus, and transmit the received input to one or more components in the terminal 100, or may be configured to transmit data between the terminal 100 and an external apparatus.

The memory 109 may be configured to store software programs and various data. The memory 109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 109 may include a high-speed random access memory, or may include a non-volatile memory, for example, at least one magnetic disk storage device, a flash memory, or other volatile solid-state storage devices.

The processor 110 is a control center of the terminal 100. The processor 110 uses various interfaces and lines to connect all parts of the entire terminal 100, and performs various functions and data processing of the terminal 100 by running or executing the software program and/or module stored in the memory 109 and invoking data stored in the memory 109, thereby performing overall monitoring on the terminal 100. The processor 110 may include one or more processing units. Optionally, the processor 110 may integrate an application processor and a modem processor. The application processor mainly processes the operating system, a user interface, an application program, and the like. The modem processor mainly processes wireless communication. It may be understood that the modem processor may alternatively not be integrated into the processor 110.

The terminal 100 may further include the power supply 111 (for example, a battery) supplying power to all components. Optionally, the power supply 111 may be logically connected to the processor 110 through a power management system. In this way, functions such as charge management, discharge management, and power consumption management are implemented by using the power management system.

In addition, the terminal 100 includes some functional modules that are not illustrated. Details are not described herein.

Embodiment 6

Figure 7:
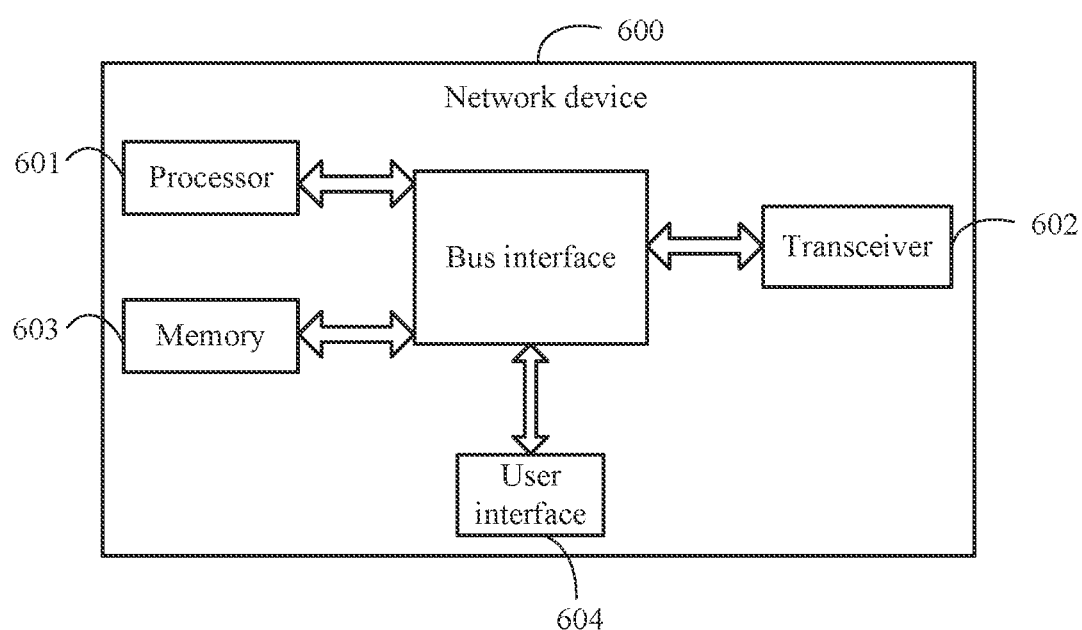
FIG. 7 is a second schematic structural diagram of a network device according to an embodiment of the present disclosure.

FIG. 7 is a schematic diagram of a hardware structure of a network device for implementing the embodiments of the present disclosure. The network device 600 includes a processor 601, a transceiver 602, a memory 603, a user interface 604, and a bus interface.

The transceiver 602 is configured to send first resource configuration information to a terminal, where the first resource configuration information is used to indicate M first frequency resources and N second frequency resources, and M and N are positive integers greater than or equal to 1. The transceiver 602 is further configured to receive a random access request sent by the terminal on a target first frequency resource, and send a random access response on a target second frequency resource to the terminal, where the target first frequency resource is a free frequency resource in the M first frequency resources, and the target second frequency resource is a free frequency resource in the N second frequency resources.

The network device provided by this embodiment of the present disclosure allocates one or more frequency resources for various messages (such as the random access request and the random access response) in a random access process, so that the frequency resources used for the messages in the random access process do not overlap and that a delay and a failure rate of the random access process are reduced.

In this embodiment of the present disclosure, in FIG. 7, a bus architecture may include any quantity of interconnect buses and bridges, specifically for interconnecting various circuits of one or more processors represented by the processor 601 and a memory represented by the memory 603. The bus architecture may further interconnect various other circuits such as a peripheral device, a voltage regulator, and a power management circuit. These are all well known in the art, and therefore are not further described in this specification. The bus interface provides an interface. The transceiver 602 may be a plurality of components, that is, the transceiver 602 includes a transmitter and a receiver, and provides a unit for communicating with various other apparatuses over a transmission medium. For different user equipment, the user interface 604 may also be an interface for externally or internally connecting a required device, and the connected device includes but is not limited to a mini keyboard, a display, a speaker, a microphone, a joystick, or the like. The processor 601 is responsible for bus architecture management and general processing. The memory 603 may store data used when the processor 601 performs an operation.

In addition, the network device 600 includes some functional modules that are not shown, details of which are not described herein.

Embodiment 7

Optionally, this embodiment of the present disclosure further provides a terminal, including a processor, a memory, and a computer program stored in the memory and capable of running on the processor. When the computer program is executed by the processor, the processes of the random access method in Embodiment 1 are implemented, and a same technical effect can be achieved. To avoid repetition, details are not described again herein.

Embodiment 8

Optionally, this embodiment of the present disclosure further provides a network device, including a processor, a memory, and a computer program stored in the memory and capable of running on the processor. When the computer program is executed by the processor, the processes of the random access method in Embodiment 1 are implemented, and a same technical effect can be achieved. To avoid repetition, details are not described again herein.

Embodiment 9

This embodiment of the present disclosure further provides a computer-readable storage medium, where a computer program is stored in the computer-readable storage medium. When the computer program is executed by a processor, the procedures of the random access method in the foregoing embodiments are implemented. To avoid repetition, details are not described again herein. The computer-readable storage medium is, for example, a Read-Only Memory (ROM), a Random Access Memory (RAM), a magnetic disk, or an optical disc.

It should be noted that in this specification, the term "comprise", "include", or any other variant thereof is intended to cover a non-exclusive inclusion, such that a process, a method, an article, or an apparatus that includes a list of elements includes not only those elements but also other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of the present disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the embodiments. The embodiments are only illustrative rather than restrictive. Inspired by the present disclosure, a person of ordinary skill in the art can still derive a plurality of variations without departing from the essence of the present disclosure and the protection scope of the claims. All these variations shall fall within the protection of the present disclosure.

What is claimed is:

1. A random access method, performed by a network device, comprising:
    sending first resource configuration information to a terminal, wherein the first resource configuration information comprises resource configuration information for sending a random access request and resource configuration information for receiving a random access response, the resource configuration information for sending the random access request is used to indicate M first frequency resources, the resource configuration information for receiving the random access response is used to indicate N second frequency resources, and M and N are positive integers greater than or equal to 1;
    selecting at least one free frequency resource from the M first frequency resources indicated by the first resource configuration information as a target first frequency resource;
    receiving the random access request sent by the terminal on the target first frequency resource;
    selecting at least one free frequency resource from the N second frequency resources indicated by the first resource configuration information as a target second frequency resource; and
    sending the random access response on the target second frequency resource to the terminal.

2. The random access method according to claim 1, wherein selecting at least one free frequency resource from the N second frequency resources indicated by the first resource configuration information as a target second frequency resource comprises:
    monitoring some or all second frequency resources in the N second frequency resources; and
    when the network device detects that X second frequency resources in the some or all second frequency resources are free, using at least one of the X second frequency resources as the target second frequency resource, wherein X is less than or equal to a quantity of the some or all second frequency resources, and X is a positive integer greater than or equal to 1.

3. The random access method according to claim 2, wherein monitoring some or all second frequency resources in the N second frequency resources comprises: monitoring the some or all second frequency resources in the N second frequency resources according to a fifth predetermined rule,
    wherein the fifth predetermined rule comprises at least one of the following: second frequency resources satisfying a first condition are monitored, or a quantity of monitored second frequency resources is less than or equal to a sixth threshold,
    wherein the first condition is that a frequency measurement value corresponding to the second frequency resource is greater than or equal to a second threshold, and the sixth threshold is less than or equal to N.

4. The random access method according to claim 2, wherein using at least one of the X second frequency resources as the target second frequency resource comprises: selecting at least one of the X second frequency resources as the target second frequency resource according to a sixth predetermined rule,
    wherein the sixth predetermined rule comprises at least one of the following: second frequency resources satisfying a first condition are selected, or a quantity of selected second frequency resources is less than or equal to a seventh threshold,
    wherein the first condition is that a frequency measurement value corresponding to the second frequency resource is greater than or equal to a second threshold, and the seventh threshold is less than or equal to X.

5. The random access method according to claim 1, wherein the first resource configuration information is further used to indicate K third frequency resources and L fourth frequency resources; or the random access response comprises second resource configuration information, and the second resource configuration information is used to indicate K third frequency resources and L fourth frequency resources.

6. The random access method according to claim 5, wherein after sending the random access response on the target second frequency resource to the terminal, the method further comprises:
receiving uplink data sent by the terminal on a target third frequency resource; and
sending a contention resolution message on a target fourth frequency resource to the terminal, wherein:
the contention resolution message is used to indicate whether the terminal has successfully completed a random access process;
the target third frequency resource is a free frequency resource in the K third frequency resources; and
the target fourth frequency resource is a free frequency resource in the L fourth frequency resources.

7. The random access method according to claim 6, wherein before sending the contention resolution message on the target fourth frequency resource to the terminal, the method further comprises:
monitoring some or all fourth frequency resources in the L fourth frequency resources; and
when the network device detects that J fourth frequency resources in the some or all fourth frequency resources are free, using at least one of the J fourth frequency resources as the target fourth frequency resource,
wherein J is less than or equal to a quantity of the some or all fourth frequency resources, and J is a positive integer greater than or equal to 1.

8. The random access method according to claim 7, wherein monitoring some or all fourth frequency resources in the L fourth frequency resources comprises: monitoring the some or all fourth frequency resources in the L fourth frequency resources according to a seventh predetermined rule,
wherein the seventh predetermined rule comprises at least one of the following: fourth frequency resources satisfying a first condition are monitored, or a quantity of monitored fourth frequency resources is less than or equal to an eighth threshold,
wherein the first condition is that a frequency measurement value corresponding to the fourth frequency resource is greater than or equal to a second threshold, and the eighth threshold is less than or equal to L.

9. The random access method according to claim 7, wherein using at least one of the J fourth frequency resources as the target fourth frequency resource comprises: selecting at least one of the J fourth frequency resources as the target fourth frequency resource according to an eighth predetermined rule,
wherein the eighth predetermined rule comprises at least one of the following: fourth frequency resources satisfying a first condition are selected, or a quantity of selected fourth frequency resources is less than or equal to a ninth threshold,
wherein the first condition is that a frequency measurement value corresponding to the fourth frequency resource is greater than or equal to a second threshold, and the ninth threshold is less than or equal to J.

10. A network device, comprising:
a memory storing a computer program; and
a processor coupled to the memory and configured to execute the computer program to perform operations comprising:
sending first resource configuration information to a terminal, wherein the first resource configuration information comprises resource configuration information for sending a random access request and resource configuration information for receiving a random access response, the resource configuration information for sending the random access request is used to indicate M first frequency resources, the resource configuration information for receiving the random access response is used to indicate N second frequency resources, and M and N are positive integers greater than or equal to 1;
selecting at least one free frequency resource from the M first frequency resources indicated by the first resource configuration information as a target first frequency resource;
receiving the random access request sent by the terminal on the target first frequency resource;
selecting at least one free frequency resource from the N second frequency resources indicated by the first resource configuration information as a target second frequency resource; and
sending the random access response on the target second frequency resource to the terminal.

11. The network device according to claim 10, wherein selecting at least one free frequency resource from the N second frequency resources indicated by the first resource configuration information as a target second frequency resource comprise:
monitoring some or all second frequency resources in the N second frequency resources; and
when the network device detects that X second frequency resources in the some or all second frequency resources are free, using at least one of the X second frequency resources as the target second frequency resource,
wherein X is less than or equal to a quantity of the some or all second frequency resources, and X is a positive integer greater than or equal to 1.

12. The network device according to claim 11, wherein monitoring some or all second frequency resources in the N second frequency resources comprises: monitoring the some or all second frequency resources in the N second frequency resources according to a fifth predetermined rule,
wherein the fifth predetermined rule comprises at least one of the following: second frequency resources satisfying a first condition are monitored, or a quantity of monitored second frequency resources is less than or equal to a sixth threshold,
wherein the first condition is that a frequency measurement value corresponding to the second frequency resource is greater than or equal to a second threshold, and the sixth threshold is less than or equal to N.

13. The network device according to claim 11, wherein using at least one of the X second frequency resources as the target second frequency resource comprises: selecting at least one of the X second frequency resources as the target second frequency resource according to a sixth predetermined rule,
wherein the sixth predetermined rule comprises at least one of the following: second frequency resources satisfying a first condition are selected, or a quantity of selected second frequency resources is less than or equal to a seventh threshold,
wherein the first condition is that a frequency measurement value corresponding to the second frequency resource is greater than or equal to a second threshold, and the seventh threshold is less than or equal to X.

14. The network device according to claim 11, wherein the first resource configuration information is further used to indicate K third frequency resources and L fourth frequency resources; or the random access response comprises second resource configuration information, and the second resource configuration information is used to indicate K third frequency resources and L fourth frequency resources.

15. The network device according to claim 14, wherein after sending the random access response on the target second frequency resource to the terminal, the operations further comprise:
receiving uplink data sent by the terminal on a target third frequency resource; and
sending a contention resolution message on a target fourth frequency resource to the terminal, wherein:
the contention resolution message is used to indicate whether the terminal has successfully completed a random access process;
the target third frequency resource is a free frequency resource in the K third frequency resources; and
the target fourth frequency resource is a free frequency resource in the L fourth frequency resources.

16. The network device according to claim 15, wherein before sending the contention resolution message on the target fourth frequency resource to the terminal, the operations further comprise:
monitoring some or all fourth frequency resources in the L fourth frequency resources; and
when the network device detects that J fourth frequency resources in the some or all fourth frequency resources are free, using at least one of the J fourth frequency resources as the target fourth frequency resource,
wherein J is less than or equal to a quantity of the some or all fourth frequency resources, and J is a positive integer greater than or equal to 1.

17. The network device according to claim 16, wherein monitoring some or all fourth frequency resources in the L fourth frequency resources comprises: monitoring the some or all fourth frequency resources in the L fourth frequency resources according to a seventh predetermined rule,
wherein the seventh predetermined rule comprises at least one of the following: fourth frequency resources satisfying a first condition are monitored, or a quantity of monitored fourth frequency resources is less than or equal to an eighth threshold,
wherein the first condition is that a frequency measurement value corresponding to the fourth frequency resource is greater than or equal to a second threshold, and the eighth threshold is less than or equal to L.

18. The network device according to claim 16, wherein using at least one of the J fourth frequency resources as the target fourth frequency resource comprises: selecting at least one of the J fourth frequency resources as the target fourth frequency resource according to an eighth predetermined rule,
wherein the eighth predetermined rule comprises at least one of the following: fourth frequency resources satisfying a first condition are selected, or a quantity of selected fourth frequency resources is less than or equal to a ninth threshold,
wherein the first condition is that a frequency measurement value corresponding to the fourth frequency resource is greater than or equal to a second threshold, and the ninth threshold is less than or equal to J.

19. A non-transitory computer-readable storage medium, storing a computer program, when the computer program is executed by a processor, causes the processor to perform operations comprising:
sending first resource configuration information to a terminal, wherein the first resource configuration information comprises resource configuration information for sending a random access request and resource configuration information for receiving a random access response, the resource configuration information for sending the random access request is used to indicate M first frequency resources, the resource configuration information for receiving the random access response is used to indicate N second frequency resources, and M and N are positive integers greater than or equal to 1;
selecting at least one free frequency resource from the M first frequency resources indicated by the first resource configuration information as a target first frequency resource;
receiving the random access request sent by the terminal on the target first frequency resource;
selecting at least one free frequency resource from the N second frequency resources indicated by the first resource configuration information as a target second frequency resource; and
sending the random access response on the target second frequency resource to the terminal.

20. The non-transitory computer-readable storage medium according to claim 19, wherein selecting at least one free frequency resource from the N second frequency resources indicated by the first resource configuration information as a target second frequency resource comprise:
monitoring some or all second frequency resources in the N second frequency resources, and
when the network device detects that X second frequency resources in the some or all second frequency resources are free, using at least one of the X second frequency resources as the target second frequency resource,
wherein X is less than or equal to a quantity of the some or all second frequency resources, and X is a positive integer greater than or equal to 1.

* * * * *